United States Patent
Torng et al.

(10) Patent No.: US 7,379,545 B2
(45) Date of Patent: May 27, 2008

(54) METHOD FOR AUTOMATIC CALL-TRANSFER USING A SOFTPHONE

(75) Inventors: Shin-Ren Torng, Taoyuan (TW);
Chin-Chuan Hsu, Taoyuan (TW);
Nai-Chi Fang, Taoyuan (TW);
Yuan-Jung Ho, Taoyuan (TW);
Jin-Long Lou, Taoyuan (TW);
Chia-Yuan Chen, Taoyuan (TW);
Jim-Liang Jou, Taoyuan (TW)

(73) Assignee: Chunghwa Telecom Co., Ltd., Taoyuan (TW)

( * ) Notice: Subject to any disclaimer, the term of this patent is extended or adjusted under 35 U.S.C. 154(b) by 870 days.

(21) Appl. No.: 10/771,362

(22) Filed: Feb. 5, 2004

(65) Prior Publication Data

US 2005/0175164 A1 Aug. 11, 2005

(51) Int. Cl.
*H04M 3/42* (2006.01)
(52) U.S. Cl. ............................. 379/212.01; 379/211.02; 379/219
(58) Field of Classification Search ........... 379/212.01, 379/211.02, 219
See application file for complete search history.

(56) References Cited

U.S. PATENT DOCUMENTS

| 6,834,102 | B2 * | 12/2004 | Sawada et al. | 379/212.01 |
| 6,987,756 | B1 * | 1/2006 | Ravindranath et al. | 370/352 |
| 2005/0094621 | A1 * | 5/2005 | Acharya et al. | 370/352 |

* cited by examiner

*Primary Examiner*—Quynh H. Nguyen
(74) *Attorney, Agent, or Firm*—Rabin & Berdo, P.C.

(57) ABSTRACT

A system for automatic call-transfer using a softphone, which applies the functions of a hardware telephone on a personal computer, is achieved by integrating a softphone system, a computer-telephony integration system, and a private branch exchange. This system is performed mainly in a manner of automatically fast swapping the first line and the second line of a call, when a call is transferred to an interactive voice system, for example, and this system can successfully compensate the fault that a holding noise emerges from the current telephone exchange device. When a call center operator talks with the customer, if the line needs to be transferred to a interactive voice response system but the interactive voice response system cannot pick up the line timely, this system can be used to transfer a call to avoid the customer listening the holding voice or rings of the private branch exchange.

7 Claims, 3 Drawing Sheets

METHOD FOR AUTOMATIC CALL-TRANSFER USING A SOFTPHONE

BACKGROUND OF THE INVENTION

1. Field of the Invention

The present invention relates to a method for automatic call-transfer using a softphone, and in particular to a system for automatic call-transfer using a softphone, which applied on a personal computer (PC), wherein integrates a softphone system, a computer telephony integration system (CTI), and a private branch exchange (PBX).

2. Description of the Prior Art

When a call center operator transfers a customer call, if the object called cannot pick up the phone timely, will let the customer listening a holding voice. If the operator manually switches back the call, then the call cannot be transferred again timely while the object called picks up the phone. If the object called is a voice system and the call center also intends that the customer does not have a feeling the connection of the call is interrupted during the transfer process, so the manual way for transferring a call cannot satisfy the customer requirement. Accordingly, it can be seen that the above-described conventional technique still has many drawbacks, and are not designed well, and need to be improved badly.

In view of disadvantages derived from the above-described, the present inventor had devoted to improve and innovate, and, after studying intensively, developed successfully a method for automatic call-transfer using a softphone according to the invention.

SUMMARY OF THE INVENTION

The object of the present invention is to provide a method for automatic call-transfer using a softphone which comprises: receiving an incoming call at a private branch exchange telephone device, transmitting the event of the incoming call from the private branch exchange telephone device to a computer-telephony integration system; informing a first line of a system for automatic call-transfer using a softphone of the incoming call event via the computer-telephony integration system; opening a second line for enquiring the third party by the system for automatic call-transfer using a softphone after the first line is connected; swapping active line back to the first line before the third party responses; swapping again to the second line and transfers the second line to the customer by the system for automatic call-transfer using a softphone after the response event of the third party is returned. Using this method, the call-transfer of a call center can be more simplified and comfortable, and thus the fault manually transferring a call, which unable to control time accurately and resolve the holding voice noise when transferred, can be improved.

The method for automatic call-transfer using a softphone which can achieve the above-mentioned object is based on the fast-swapping between two lines as the theory foundation, utilizes Microsoft Visual Basic and Visual C++ programming languages as program design tools, communicates with a PBX via the database functions of a computer-telephony integration system; the function for automatic call-transfer using a softphone and a graphical user interface are provided by a softphone control component (SPUI.OCX); the primary functions of a softphone is provided by a softphone low-level object (CTCSP.OCX); and an interface developed for integrating applications is provided by a softphone execution file (CASSPEXE.DLL) component; 5 steps are performed: (1) consulting the second line; (2) switching first to the first line; (3) waiting for response; (4) swapping to the second line; (5) transferring the call.

BRIEF DESCRIPTION OF THE DRAWINGS

The drawings disclose an illustrative embodiment of the present invention which serves to exemplify the various advantages and objects hereof, and are as follows.

DIAGRAM REMARKS 21 private branch exchange (PBX)
25 interactive voice response system (IVR)
31 computer-telephony connection server (CTConnect Server)
33 computer-telephony application interface component (CTCAPI32.dll)
34 contact information management database (CIM DB)
35 contact information management service (CIM Service)
36 contact information management component service object (CIM MTS Obj)
37 configuration management environment component service object (CME DB)
381 softphone low-level control (CTCSP.OCX)
382 softphone control (SPUI.OCX)
383 softphone execution file (CASSPEXE.DLL)
384 Application

DETAILED DESCRIPTION OF THE PREFERRED EMBODIMENT

The present invention is used for improving and avoiding the holding voice noise of the transfer function of a private branch exchange system. In the practice of call-transfer, generally opening a second line is required for consulting at first, and the call is transferred after the enquiry is successful. However, the enquiry often needs several seconds to wait for response and the holding noise occurs at this time. Furthermore, the current private branch exchange cannot play a constant segment of a certain voice but continuingly, and thus sometimes plays the middle segment of a voice and sometimes the tail-segment of a voice. The present invention provides a method for fast automatic call-transfer to improve such a problem.

Figure 1:
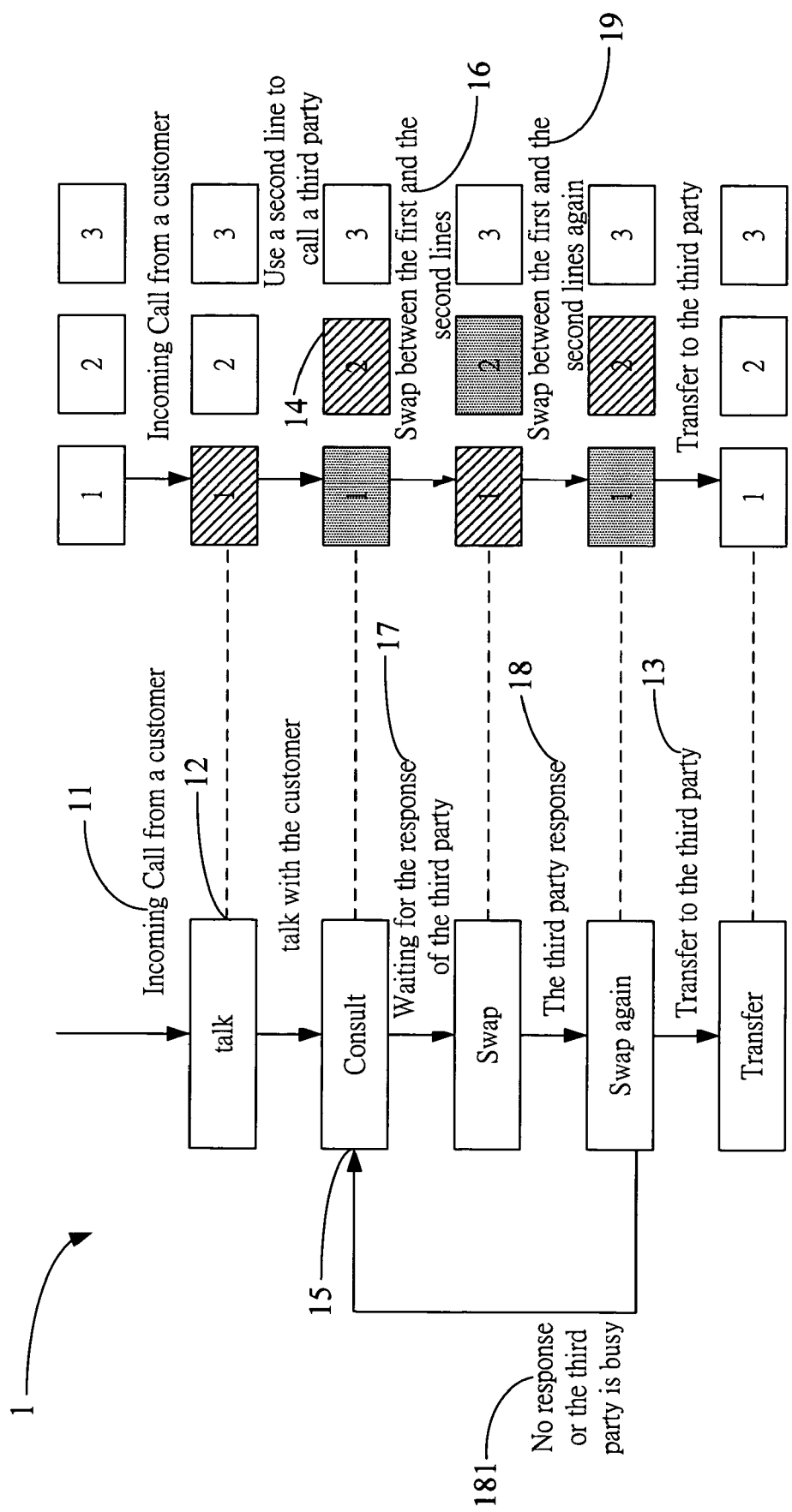
FIG. 1 is the flow chart of the method for automatic call-transfer using a softphone according with the present invention.

Please referring to FIG. 1, a flow chart of the method for automatic call-transfer using a softphone according to the present invention comprising 5 steps shown from top to bottom is provided. First, the call center operator receives an incoming call from a customer 11, after talks with the customer 12, transfers the call to the third party 13 (e.g., is an interactive voice response system in an example.), promptly opens a second line 14 to consult the third party 15 after the call is transferred to the third party, at this time fast switch to the first line 16 before the third party responses, therefore the customer and the customer service representative both can stay on the first line 17 until the response event of the third party is returned 18, then again fast swaps the call to the second line 19 and transfers the call. If at this time the third party is busy or has no response 181, the second line is hung up and restarts the transfer process. Wherein there is a limit to transfer a call to the third party, as a computer-telephony integration system is used in an example (CTConnect), after the call is swapped to the first line 16, it should be noted that the call must be re-swapped to the line enquired, that is, the second line 19, before the call is transferred.

Figure 2:
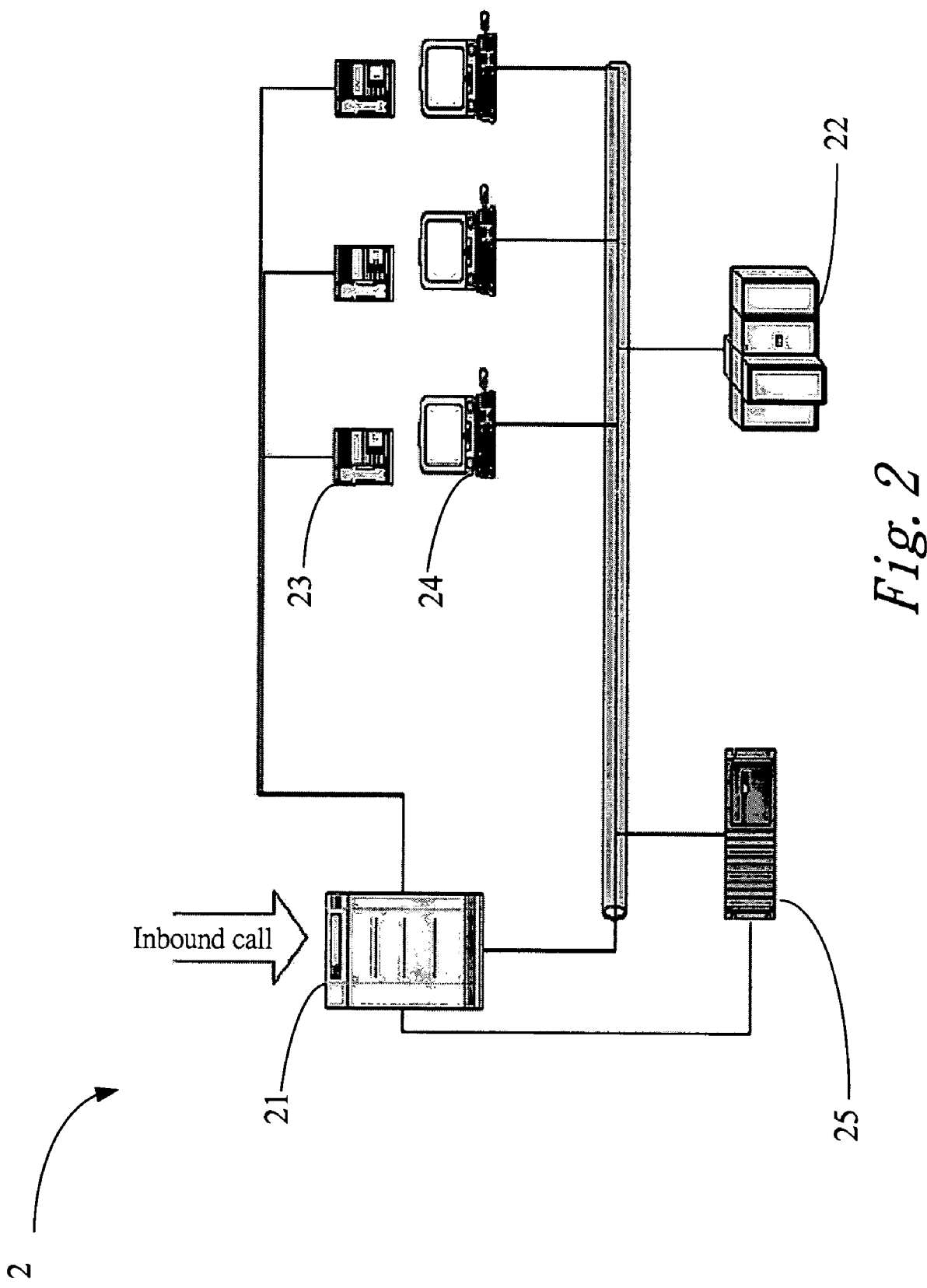
FIG. 2 is the hardware-related framework diagram of the method for automatic call-transfer using a softphone according with the present invention.

Please refer to FIG. 2, a hardware-related framework diagram of the method for automatic call-transfer using a softphone according with the present invention connecting with the external systems is provided. First an external incoming call dials a private branch exchange 21, at this time the computer-telephony integration system 22 receives a call incoming event and writes the incoming information into the contact information management database, wherein subsequently the hardware phone 23 also rings. The method for automatic call-transfer using a softphone in a personal computer 24 receives the incoming notification events from the computer-telephony integration system 22. After talking by telephone, then the call is transferred to the interactive voice response system 25, thus completes the 5 steps above-mentioned.

Figure 3:
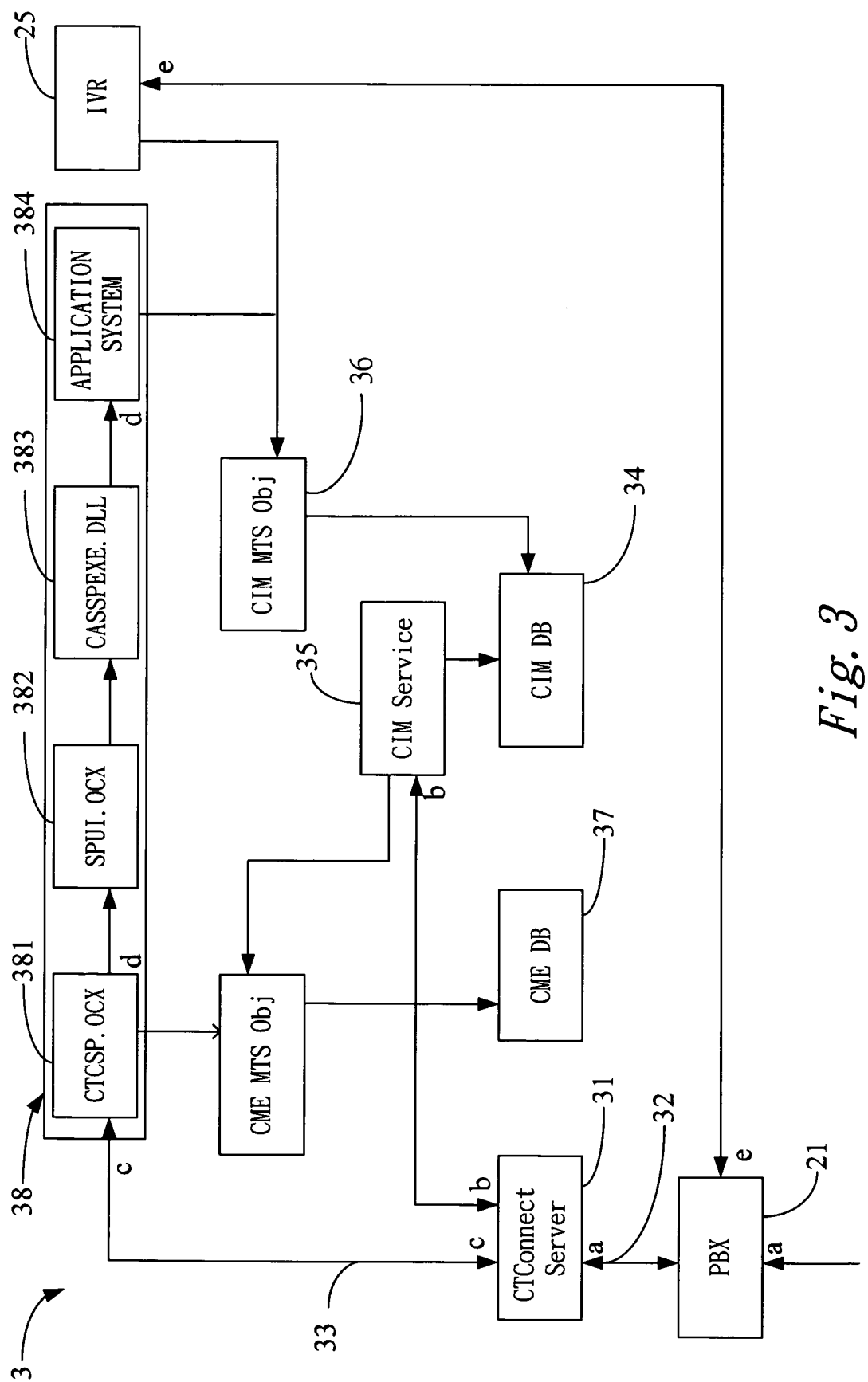
FIG. 3 is the software-related framework diagram of the method for automatic call-transfer using a softphone according with the present invention.

The software-related framework diagram of the method for automatic call-transfer using a softphone according with the present invention connecting with other software systems is shown in FIG. 3.

The computer-telephony integration server (CTConnect Server) 31: connects with a private branch exchange 21 via a computer-telephony interface (CTI Link) 32, which can retrieve the call events from the private branch exchange 21, also can send commands to the private branch exchange 21, a customer service representative can retrieve the events of the private branch exchange 21 and can control the private branch exchange 21 through the computer-telephony connection application (ctcapi32.dll)33.

The contact information management database (CIM DB)34: this database is used for storing the information of all incoming calls.

The contact information management service (CIM Service)35: retrieves the call events from the computer-telephony connection server (CTConnect server)31 through the computer-telephony connection application (ctcapi32.dll)33, induces the related events of incoming calls of the same customer and stores the incoming call data into the call incoming record system database (CIM DB)34.

The contact information management component service object (CIM MTS Obj)36: this component provides functions for consulting and adding the related information of a certain incoming call into the contact information management.

The configuration management environment database (CME DB)37: this database stores the call-related settings, such as the corresponding configuration of an agent computer information and the monitor-related settings.

The softphone low-level object (CTCSP.OCX) 381: a computer-telephony transfer function component, using the computer-telephony connection application (CTCAPI32.dll)33, provides the primary functions to a softphone.

The softphone control (SPUI.OCX)382: a computer-telephony transfer function component, using the soft-phone low-level object (CTCSP.OCX) 381, provides the functions for automatic call-transfer using a softphone and for a general phone and has a graphical user interface.

The softphone execution file (CASSPEXE) 383: a computer-telephony transfer function component, contains the softphone control (SPUI)382, and provides a interface for integrating with other applications.

PBX 21: The private branch exchange.

The flow chart is described as following:

a. A customer dials the call center, the private branch exchange (PBX)21 informs the computer-telephony connection server (CTConnect Server)31 of the call event via the computer-telephony connection interface (CTI Link)32.

b. CTConnect Server 31 informs CIM Service 35, CIM Service 35 creates the incoming information for the incoming call.

c. CTCSP.OCX 381 receives the event of CTConnect Server 31.

d. The softphone starts up the auto-transfer function after the operator talks with the customer, that is, CTCSP.OCX 381 informs SPUI.OCX 382, SPUI.OCX 382 informs CASSPEXE.DLL 383, CASSPEXE.DLL 383 informs the application 384 e. The call is transferred to the interactive voice response system25 (the third party)

As compared with other conventional techniques, the method for automatic call-transfer using a softphone according to the present invention has advantages to improve the fluency of a call-transfer, provides better communication experience for callers and the performance of the call-transfer operation may not be affected.

The above-described with details is aimed for illustrating one of feasible embodiments of the present invention, but it is not intended that the embodiment is used to limit the scope of the present invention claimed, all equivalent implementations and modifications without departing from the scope and spirit of the present invention all should be encompassed within the appended claims of the present invention.

To conclude the above-mentioned, the present invention not only is a sure innovation of a technical idea but also has multiple efficacies the conventional methods cannot achieve, thus already meets the prerequisite conditions of novelty and inventive step for claiming an invention, therefore an application of this invention is brought up according to law for the approbation.

Many changes and modifications in the above described embodiment if the invention can, of course, be carried out without departing from the scope thereof. Accordingly, to promote the progress in science and the useful arts, the invention is disclosed and is intended to be limited only by the scope of appended claims.

What is claimed is:

1. A method for automatic call-transfer using a softphone, the method comprising the steps of:

step 1, receiving an incoming call at a private branch exchange;

step 2, transmitting an event of the incoming call from the private branch exchange to a computer-telephony integration system;

step 3, informing a first line of a system for automatic call-transfer using the softphone of the incoming call event, via the computer-telephony integration system;

step 4, opening a second line for consulting the third party by the system for automatic call-transfer after the first line is connected;

step 5, swapping back to the first line before the third party responses; and step 6, swapping again to the second line and transferring the second line to the customer after a response event of the third party is sent to the system for automatic call-transfer.

wherein the computer-telephony integration system in step 2 comprises: a computer-telephony connection server, a contact information management service, a configuration management environment database, a contact information management database, a configuration management environment component service object, and a contact information management component service object.

2. The method of claim 1, wherein an application interface provided by the computer-telephony connection server connecting the softphone is CTCAPI32.dll.

3. The method of claim 1, wherein the computer-telephony connection server connects with the telephone exchange device via a computer-telephone connection interface.

4. The method of claim 1, wherein the call incoming record system service is obtained from the computer-telephony connection server via a computer-telephony connection application and induces a set of information related to the incoming call event and stores the set of information related to the incoming call event into the contact information management database.

5. The method of claim 1, wherein the third party in step 4 is an interactive voice response system.

6. A method for automatic call-transfer using a softphone, the method comprising the steps of:

step 1, receiving an incoming call at a telephone exchange device:

step 2, transmitting an event of the incoming call from the telephone exchange device to a computer-telephony integration system:

step 3, informing a first line of a system for automatic call-transfer using the softphone of the incoming call event, via the computer-telephony integration system;

step 4, opening a second line for consulting the third party by the system for automatic call-transfer using a softphone after the first line is connected;

step 5, swapping back to the first line before the third party responses; and step 6, swapping again to the second line and transferring the second line to the customer after a response event of the third party is sent to the system for automatic call-transfer using a softphone, wherein the system for automatic call-transfer using softphone in step 3 comprises:

a softphone control component, wherein the softphone control component is the main program of the system for automatic call-transfer, uses a softphone low-level object, and provides functions and a graphical user interface for automatic call-transfer using the softphone;

the softphone low-level object, using a computer-telephony connection application of a computer-telephony connection server, provides primary functions of the softphone; and a softphone execution file (CASSPEXE.DLL), contains the softphone control component, and provides an interface developed for integrating applications.

7. The method of claim 6, wherein the third party in step 2 is an interactive voice response system.

* * * * *